(12) United States Patent
Ghanekar et al.

(10) Patent No.: US 9,471,570 B2
(45) Date of Patent: Oct. 18, 2016

(54) METHOD AND SYSTEM FOR USER SELECTION OF QUERY SUGGESTIONS

(71) Applicant: Yahoo! Inc., Sunnyvale, CA (US)

(72) Inventors: Amol Ghanekar, Sunnyvale, CA (US); Bharadhwaj Narayanan, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 217 days.

(21) Appl. No.: 14/265,509

(22) Filed: Apr. 30, 2014

(65) Prior Publication Data

US 2015/0317316 A1   Nov. 5, 2015

(51) Int. Cl.
*G06F 7/02* (2006.01)
*G06F 17/30* (2006.01)

(52) U.S. Cl.
CPC ............ *G06F 17/30* (2013.01); *G06F 17/3064* (2013.01); *G06F 17/3097* (2013.01); *G06F 17/30554* (2013.01); *G06F 17/30864* (2013.01); *G06F 17/30867* (2013.01)

(58) Field of Classification Search
CPC ............... G06F 17/30864; G06F 17/30554; G06F 17/30867; G06F 17/3064; G06F 17/3097; G06F 17/30643
See application file for complete search history.

(56) References Cited

U.S. PATENT DOCUMENTS

| | | | | |
|---|---|---|---|---|
| 7,676,452 | B2 * | 3/2010 | Doganata | G06F 17/3064 707/999.003 |
| 8,417,718 | B1 * | 4/2013 | Finkelstein | G06F 17/3097 707/767 |
| 9,069,862 | B1 * | 6/2015 | Perkowitz | G06F 17/30867 |
| 2005/0283468 | A1 * | 12/2005 | Kamvar | G06F 17/3064 |
| 2009/0204609 | A1 * | 8/2009 | Labrou | G06F 17/3064 |
| 2012/0047134 | A1 * | 2/2012 | Hansson | G06F 17/3064 707/731 |
| 2015/0006564 | A1 * | 1/2015 | Tomkins | G06F 17/3064 707/767 |
| 2015/0012527 | A1 * | 1/2015 | Hewitt | G06F 17/30643 707/722 |
| 2015/0294029 | A1 * | 10/2015 | Sanghai | G06F 17/30973 707/732 |

* cited by examiner

*Primary Examiner* — Bruce Moser
(74) *Attorney, Agent, or Firm* — Pillsbury Winthrop Shaw Pittman LLP

(57) ABSTRACT

Methods, systems and programming for providing a search result based on user selection of query suggestions. In one example, a query is received from a user. A plurality of query suggestions generated based on the query is obtained and provided to the user. A selection of one or more query suggestions from the plurality of query suggestions is received from the user. A first search result generated based on at least one of the one or more query suggestions is obtained and provided to the user.

30 Claims, 16 Drawing Sheets

METHOD AND SYSTEM FOR USER SELECTION OF QUERY SUGGESTIONS

BACKGROUND

1. Technical Field

The present teaching relates to methods, systems, and programming for Internet services. Particularly, the present teaching is directed to methods, systems, and programming for search suggestion.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for specified keywords and return a list of the documents where the keywords were found. Known major search engines have features called "search suggestion" designed to help users narrow in on what they are looking for. For example, as a user types a search query, a list of query suggestions that have been used by many other users before are displayed to assist the user in selecting a desired query.

However, existing techniques are limited to one search at a time based on one query suggestion selected by a user. For example, after a user types an original term in a search box, a list of query suggestions is displayed to the user. Although the user may be interested in more than one query suggestion from the list, traditional search suggestion system only allows the user to select one query suggestion at a time to run a search. So the user has to remember the other interesting query suggestions from the list or retype the original term again to see the other interesting query suggestions. It is difficult for a user to remember other query suggestions, especially if the user was distracted after selecting a first query suggestion.

Therefore, there is a need to provide an improved solution for search suggestion to solve the above-mentioned problems.

SUMMARY

The present teaching relates to methods, systems, and programming for Internet services. Particularly, the present teaching is directed to methods, systems, and programming for search suggestion.

In one example, a method, implemented on at least one machine each having at least one processor, storage, and a communication platform connected to a network for providing a search result is presented. A query is received from a user. A plurality of query suggestions generated based on the query is obtained and provided to the user. A selection of one or more query suggestions from the plurality of query suggestions is received from the user. A first search result generated based on at least one of the one or more query suggestions is obtained and provided to the user.

In another example, a method, implemented on at least one machine each having at least one processor, storage, and a communication platform connected to a network for providing a query suggestion is presented. A query is received from a user. User information associated with the user is obtained. A search record associated with the user is identified based on the user information. The search record stores one or more query suggestions previously selected by the user. A first query suggestion is retrieved from the search record based on the query. A second query suggestion is generated based at least partially on the first query suggestion and the query. The second query suggestion is provided to the user.

In yet another example, a system having at least one processor, storage, and a communication platform for providing a search result is presented. The system includes a query analyzer, a query suggestion collector, a user behavior analyzer, and one or more search engines. The query analyzer is implemented on the at least one processor and configured for receiving a query from a user. The query suggestion collector is implemented on the at least one processor and configured for obtaining a plurality of query suggestions generated based on the query and providing the plurality of query suggestions to the user. The user behavior analyzer is implemented on the at least one processor and configured for receiving a selection of one or more query suggestions from the plurality of query suggestions from the user. The one or more search engines are implemented on the at least one processor and configured for obtaining a first search result generated based on at least one of the one or more query suggestions, and providing the first search result to the user.

In a different example, a system having at least one processor, storage, and a communication platform for providing a query suggestion is presented. The system includes a request processing unit, a user identification unit, a user selected suggestion controlling unit, and a query suggestion generation unit. The request processing unit is implemented on the at least one processor and configured for receiving a query from a user. The user identification unit is implemented on the at least one processor and configured for obtaining user information associated with the user. The user selected suggestion controlling unit is implemented on the at least one processor and configured for identifying a search record associated with the user based on the user information and retrieving a first query suggestion from the search record based on the query. The search record stores one or more query suggestions previously selected by the user. The query suggestion generation unit is implemented on the at least one processor and configured for generating a second query suggestion based at least partially on the first query suggestion and the query and providing the second query suggestion to the user.

Other concepts relate to software for providing query suggestions. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for providing a search result is presented. The recorded information, when read by the machine, causes the machine to perform the following. A query is received from a user. A plurality of query suggestions generated based on the query is obtained and provided to the user. A selection of one or more query suggestions from the plurality of query suggestions is received from the user. A first search result generated based on at least one of the one or more query suggestions is obtained and provided to the user.

In another example, a non-transitory machine readable medium having information recorded thereon for providing a query suggestion is presented. The recorded information, when read by the machine, causes the machine to perform the following. A query is received from a user. User information associated with the user is obtained. A search record associated with the user is identified based on the user information. The search record stores one or more query suggestions previously selected by the user. A first query suggestion is retrieved from the search record based on the query. A second query suggestion is generated based at least partially on the first query suggestion and the query. The second query suggestion is provided to the user.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective search suggestion. The method and system as disclosed herein aim at improving end-users' search experience by helping users to remember search terms they are interested in to search quickly and easily. Based on a list of query suggestions provided to a user, the user may select one or more query suggestions which can indicate search terms the user is interested in. By allowing the user to select more than one query suggestions at a time, a search system may perform search quickly for the user.

The query suggestions selected by the user may be stored in a search record or a search bin associated with the user. In case the user stops searching for a while after receiving a search result for one of the query suggestions, the user does not have to remember other query suggestions to continue searching, because the other query suggestions can be retrieved from the search bin and provided to the user, e.g., once a user identity (ID) associated with the user and the search bin is recognized. The query suggestions stored in the search bin can be a continuous signal for the search system to track what the user is really looking for, and can be utilized for improving search results as well as search suggestion, especially during the user's future searching activities. The feature disclosed herein can also help increasing search volume for a search system, as there are multiple user-relevant search terms available for users to choose, e.g., by clicking on, which will benefit especially a user with a mobile device, since it is easy to click than to type on a mobile device.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
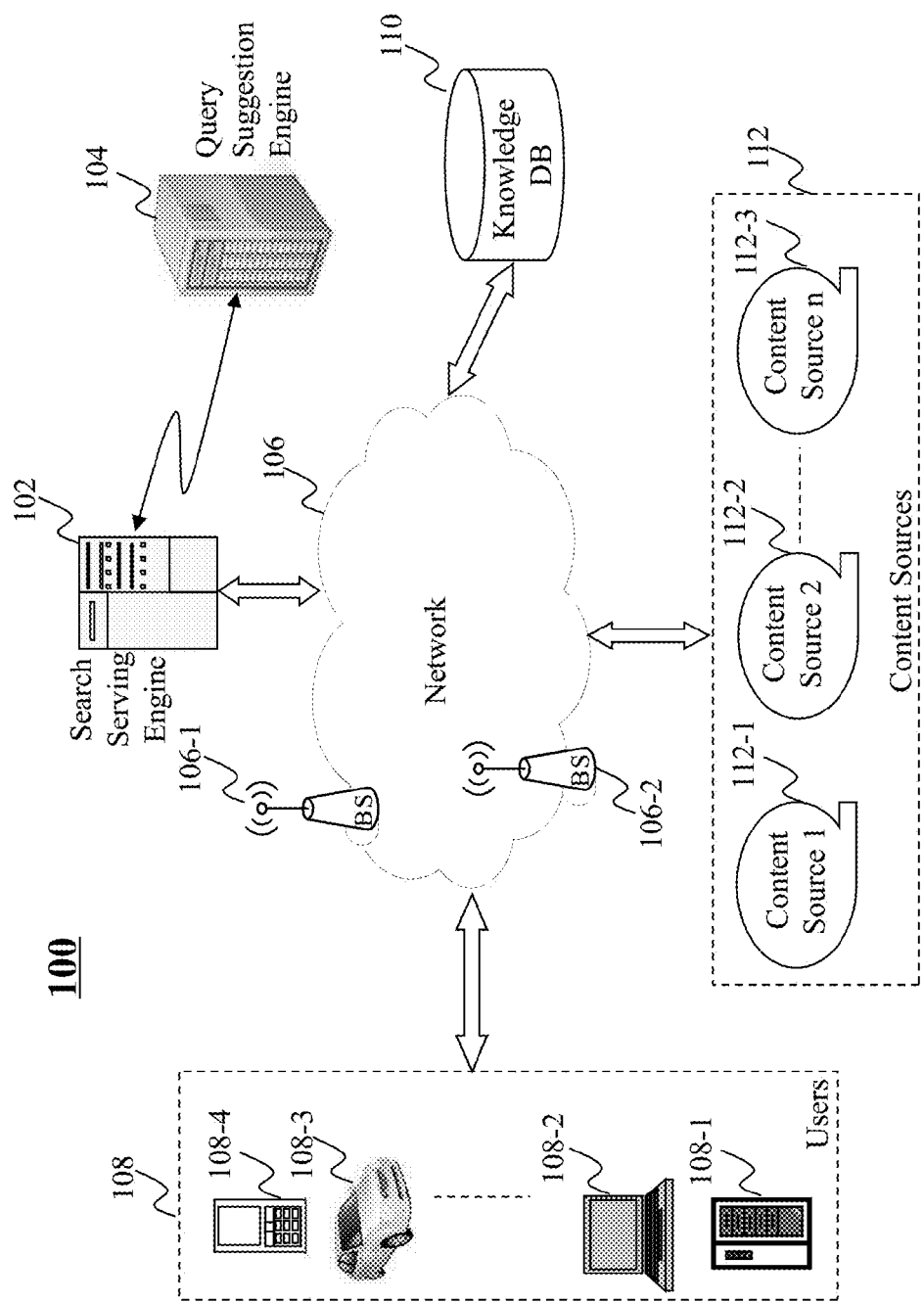
FIG. 1 is a high level depiction of an exemplary system for providing a search result based on user selection of query suggestions, according to an embodiment of the present teaching.

FIG. 1 is a high level depiction of an exemplary system 100 for providing a search result based on user selection of query suggestions, according to an embodiment of the present teaching. In FIG. 1, the exemplary system 100 includes a search serving engine 102, a query suggestion engine 104, one or more users 108, a network 106, content sources 112, and a knowledge database 110. The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 106 may be an online advertising network or ad network that is a company connecting advertisers to web sites that want to host advertisements. A key function of an ad network is aggregation of ad space supply from publishers and matching it with advertiser demand. The network 106 may also include various network access points, e.g., wired or wireless access points such as base stations or Internet exchange points 106-1 . . . 106-2, through which a data source may connect to the network 106 in order to transmit information via the network 106.

Users 108 may be of different types such as users connected to the network 106 via desktop computers 108-1, laptop computers 108-2, a built-in device in a motor vehicle 108-3, or a mobile device 108-4. A user 108 may send a query or query prefix to the search serving engine 102 via the network 106 and receive query suggestions and search results from the search serving engine 102. The query suggestions can be generated at the query suggestion engine 104, based on the query sent by the user 108. In this embodiment, the query suggestion engine 104 serves as a backend system of the search serving engine 102.

The search serving engine 102 and query suggestion engine 104 may access information stored in the knowledge database 110 via the network 106. The information in the knowledge database 110 may be generated by one or more different applications (not shown), which may be running on the search serving engine 102, at the backend of the search serving engine 102, or as a completely standalone system capable of connecting to the network 106, accessing information from different sources, analyzing the information, generating structured information, and storing such generated information in the knowledge database 110.

The content sources 112 include multiple content sources 112-1, 112-2 . . . 112-3, such as vertical content sources. A content source 112 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search serving engine 102 may access information from any of the content sources 112-1, 112-2 . . . 112-3. For example, the search serving engine 102 may fetch content, e.g., websites, through its web crawler to build a search index.

Figure 2:
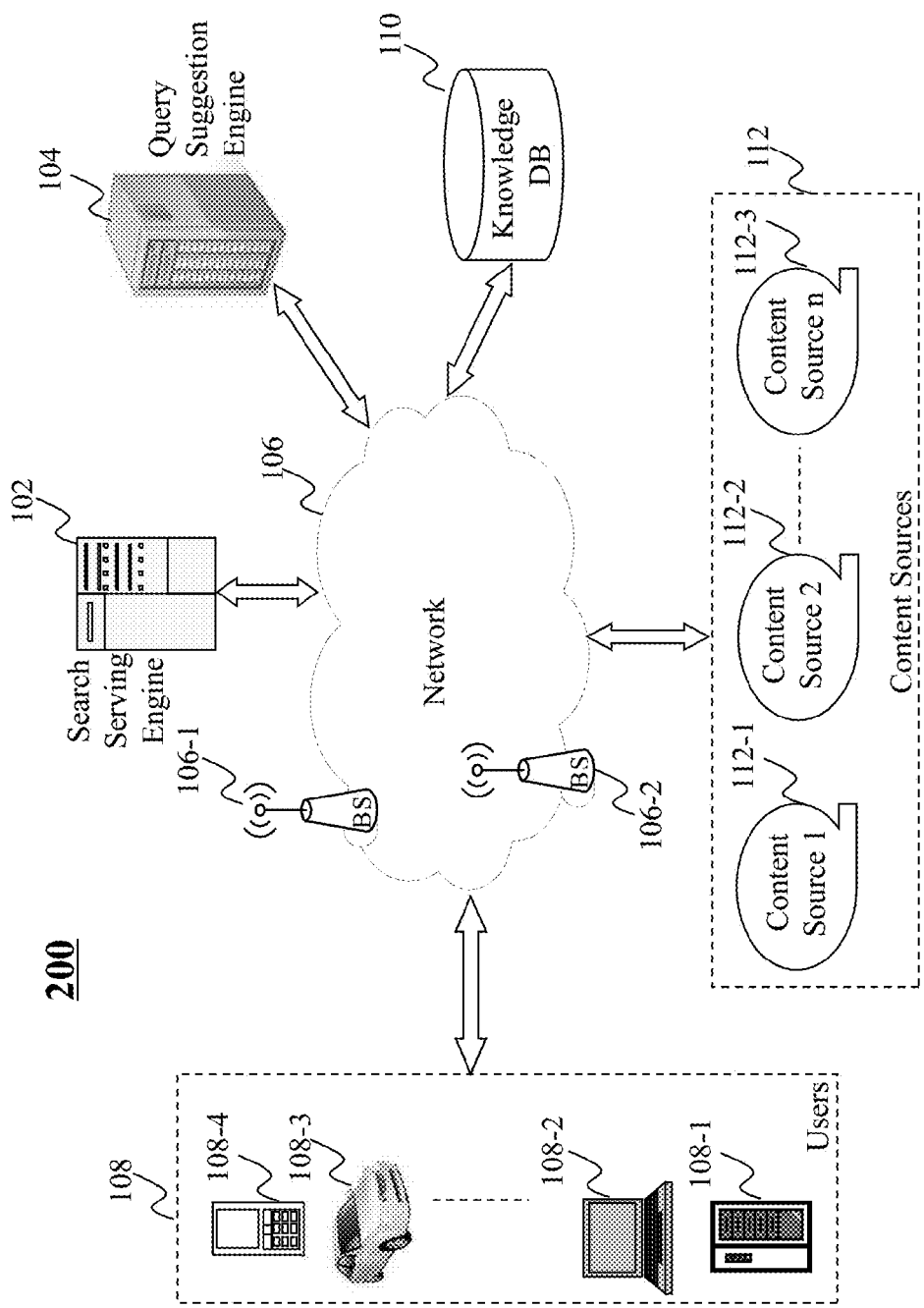
FIG. 2 is a high level depiction of another exemplary system for providing a search result based on user selection of query suggestions, according to an embodiment of the present teaching.

FIG. 2 is a high level depiction of another exemplary system 200 for providing a search result based on user selection of query suggestions, according to an embodiment of the present teaching. The exemplary system 200 in this embodiment is similar to the exemplary system 100 in FIG. 1, except that the query suggestion engine 104 in this embodiment directly connects to the network 106. For example, a company holding a query suggestion engine may serve multiple search serving engines at the same time via the network 106.

Figure 3:
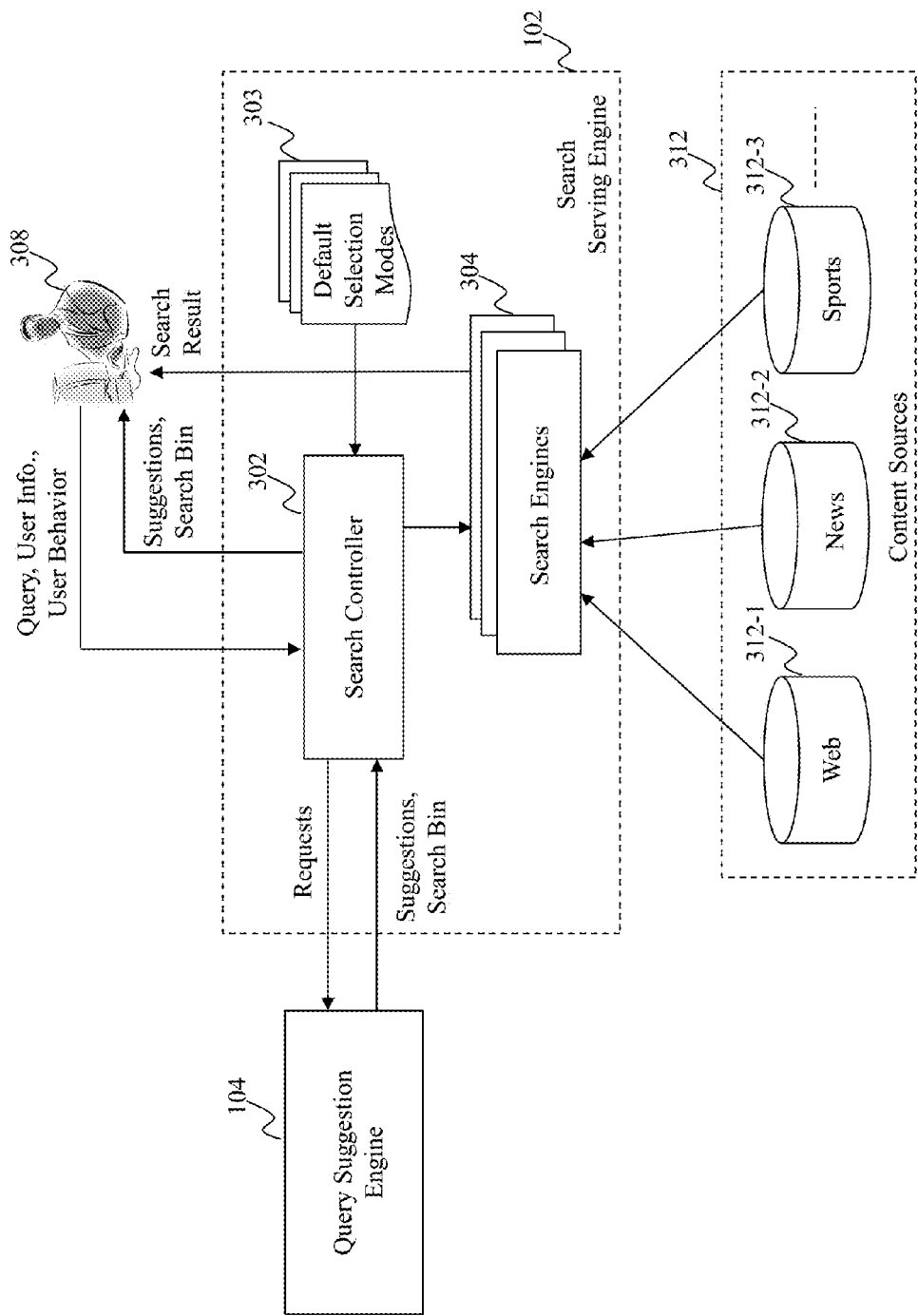
FIG. 3 illustrates an exemplary diagram of a search serving engine in a system for providing a search result based on user selection of query suggestions, according to an embodiment of the present teaching.

FIG. 3 illustrates an exemplary diagram of a search serving engine 102 in a system, e.g., system 100 in FIG. 1 or system 200 in FIG. 2, for providing a search result based on user selection of query suggestions, according to an embodiment of the present teaching. The search serving engine 102 in this example includes a search controller 302 and one or more search engines 304. The search controller 302 in this example obtains user information from a user 308, a query input by the user 308, and user behaviors from the user 308. Based on the query input by the user 308, the search controller 302 may collect query suggestions from the query suggestion engine 104 and provide the query suggestions to the user 308.

Figure 12A:
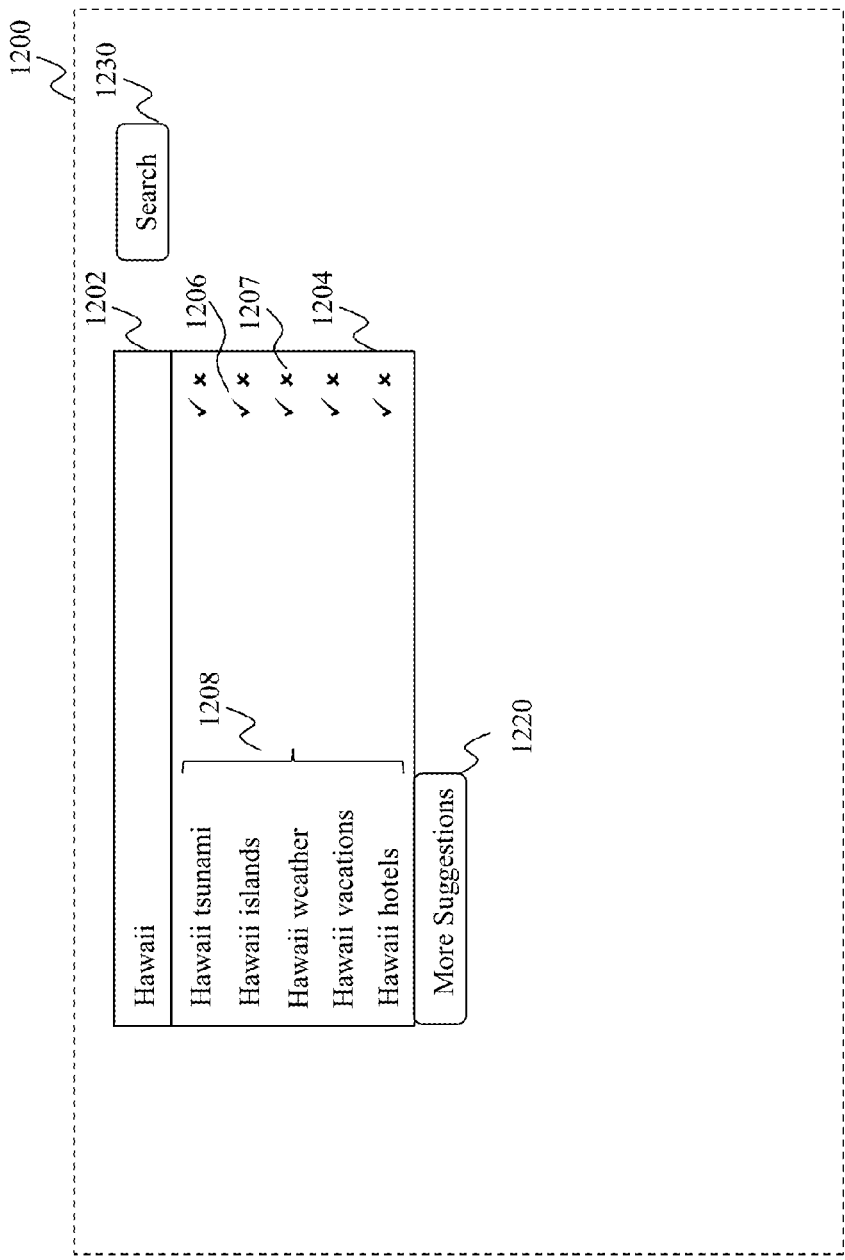
FIG. 12A depicts an exemplary web page on which a list of query suggestions is provided, according to an embodiment of the present teaching.

FIG. 12A depicts an exemplary web page 1200 on which a list of query suggestions is provided, according to an embodiment of the present teaching. The web page 1200 in this example includes a search box 1202, a search suggestion box 1204, a "More Suggestion" button 1220, and a "Search" button 1230. In this example, the user 308 has input a query "Hawaii" in the search box 1202. Based on the query "Hawaii", a list of query suggestions 1208 is provided to the user 308 in the on the search suggestion box 1204. The list of query suggestions 1208 includes "Hawaii tsunami", "Hawaii islands", "Hawaii weather", "Hawaii vacations", and "Hawaii hotels". The user 308 may select one or more query suggestions from the list of query suggestions 1208. In general, the query input by a user in the search box 1202 may be a word, a character, a number, a symbol, or any other inputs indicating intent to search.

Back to FIG. 3, behaviors of the user 308 with respect to the web page 1200 can be detected by the search controller 302. In this embodiment, the search controller 302 monitors and detects user behaviors of the user 308, in accordance with one of a plurality of default selection modes 303 stored in the search serving engine 102. Each of the default selection modes 303 indicates a manner in which the search controller 302 determines intent related to user behaviors of the user 308. For example, according to a default selection mode, the search controller 302 may monitor behaviors of the user 308 to determine: whether the user 308 selects a query suggestion, whether the user 308 deselects a query suggestion, whether the user 308 finishes selection of query suggestions, and whether the user 308 intends to start searching based on selected query suggestions. The search controller 302 may select one of the default selection modes 303 based on some user information of the user 308, e.g., information about a device being used by the user 308 to connect to the search serving engine 102.

For example, as shown in FIG. 12A, there is a pair of select symbol ("✓") 1206 and deselect symbol ("x") 1207 corresponding to each query suggestion in the list of query suggestions 1208. If the user 308 is using a laptop, the search controller 302 may select a default selection mode and monitor accordingly mouse clicks on the select symbols 1206 and deselect symbols 1207 from the user 308 to determine whether the user 308 selects or deselects a query suggestion. According to the default selection mode, the search controller 302 may also monitor a mouse click on the "More Suggestion" button 1220 from the user 308 to determine whether the user 308 wants more query suggestions in addition to the list of query suggestions 1208. Furthermore, according to the default selection mode, the search controller 302 may monitor a mouse click on the "Search" button 1230 to determine whether the user 308 finishes selection of query suggestions and whether the user 308 intends to start searching based on selected query suggestions. In accordance with another default selection mode, however, the search controller 302 may determine that the user 308 finishes selection of query suggestions and wants a search result based on selected query suggestions, if the search controller 302 has not detected any user behavior from the user 308 for a predetermined period of time, e.g., five seconds.

Once the user 308 selects a query suggestion in the list of query suggestions 1208, the selected query suggestion can be stored into a search bin corresponding to the user 308. A search bin may be a search record or a data structure associated with a user for storing query suggestions selected by the user. In this example, different search bins associated with different users are located in a user selected suggestion database in the query suggestion engine 104. Each search bin associated a user may be associated with a trash bin which is a trash record or a data structure associated with the user for storing query suggestions deselected by the user, i.e., the query suggestions that the user is not interested in and wants to delete from the search bin. Different trash bins associated with different users and different search bins are located in a user unselected suggestion database in the query suggestion engine 104.

Figure 11:
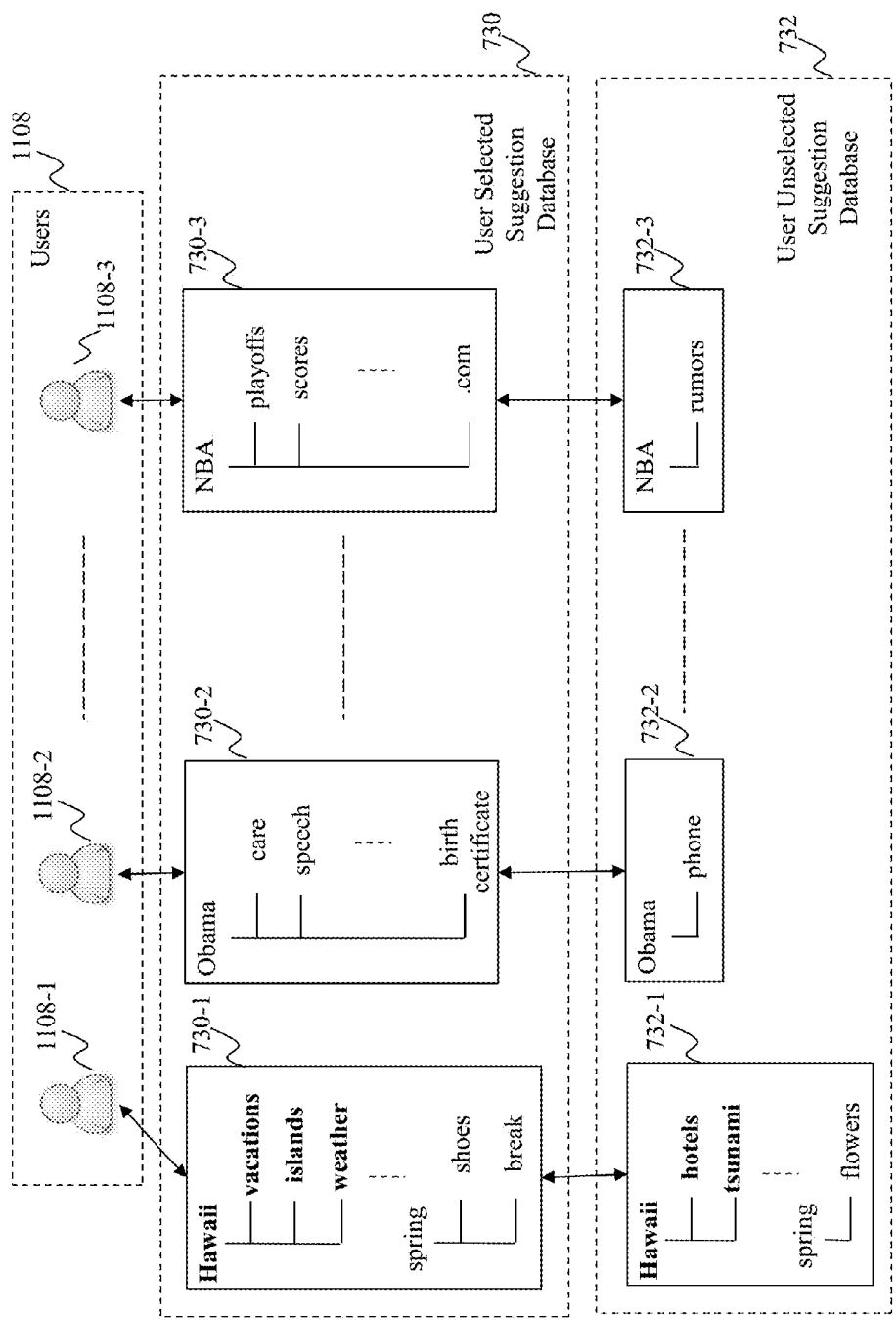
FIG. 11 depicts exemplary structures of a user selected suggestion database and a user unselected suggestion database, according to an embodiment of the present teaching.

FIG. 11 depicts exemplary structures of a user selected suggestion database 730 and a user unselected suggestion database 732, according to an embodiment of the present teaching. As described before, the user selected suggestion database 730 may be located in the query suggestion engine 104 and include a plurality of search bins 730-1, 730-2 . . . 730-3, each associated with one of a plurality of users 1108-1, 1108-2 . . . 1108-3. For example, as shown in FIG. 11, the search bin 730-2 is associated with the user 1108-2. The search bin 730-2 comprises query suggestions starting with a prefix "Obama" including "Obama care", "Obama speech" . . . "Obama birth certificate" selected by the user 1108-2. A search bin can include query suggestions starting with different prefixes, e.g., the search bin 730-1 includes query suggestions starting with prefixes "Hawaii" . . . "spring". The user unselected suggestion database 732 may be located in the query suggestion engine 104 and include a plurality of trash bins 732-1, 732-2 . . . 732-3, each associated with one of the plurality of search bins 730-1, 730-2 . . . 730-3, and with one of the plurality of users 1108-1, 1108-2 . . . 1108-3. For example, as shown in FIG. 11, the trash bin 732-3 is associated with the search bin 730-3 and the user 1108-3. The trash bin 732-3 comprises a query suggestion "NBA rumors" deselected by the user 1108-3. A trash bin can include query suggestions starting with different prefixes, e.g., the trash bin 732-1 includes query suggestions starting with prefixes "Hawaii" . . . "spring".

Back to FIG. 3, the search controller 302 may send a bin update request to the query suggestion engine 104 for generating a new search bin and/or a new trash bin associated with a user, if the user is a new registered user and just selects or deselects a query suggestion. Alternatively, the search controller 302 may send a bin update request to the query suggestion engine 104 for updating an existing search bin and/or an existing trash bin associated with a user, once the user selects or deselects a query suggestion. For example, if the user 1108-1 is provided with the list of query suggestions 1208 shown in FIG. 12A and the user 1108-1 selects query suggestions "Hawaii vacations", "Hawaii islands", and "Hawaii weather", then the search bin 730-1 associated with the user 1108-1 will be updated to include these query suggestions newly selected by the user 1108-1, as shown in FIG. 11. In one case, the user 1108-1 may select the query suggestions "Hawaii vacations", "Hawaii islands", and "Hawaii weather" by clicking on the select symbols 1206 corresponding to these query suggestions. In another case, the user 1108-1 may select the query suggestions "Hawaii vacations", "Hawaii islands", and "Hawaii weather" by clicking on the deselect symbols 1207 corresponding to the query suggestions "Hawaii tsunami" and "Hawaii hotels" and waiting for a predetermined period of time, e.g., five seconds. Then, in addition to updating the search bin 730-1, the system can also update the trash bin 732-1 by including the deselected query suggestions "Hawaii tsunami" and "Hawaii hotels" into the trash bin 732-1.

The search controller 302 may also determine that the user 308 wants a search result based on one or more of the selected query suggestions, by detecting user behaviors of the user in accordance with one of a plurality of default selection modes 303. In that case, the search controller 302 may send a search request to the one or more search engines 304 for generating a search result. The search request may include information related to the selected query suggestions. The one or more search engines 304 can perform a search within one or more content sources 312 based on the search request and generate the search result accordingly. The one or more search engines 304 could fetch results from different vertical content sources, e.g., web 312-1, news 312-2 . . . sports 312-3. The search request may also include user information associated with the user 308 to indicate a topic the user 308 is interested in so that the one or more search engines 304 may perform a search within a particular vertical content source corresponding to that topic, e.g., in the "Sports" content source 312-3. In general, the one or more search engines 304 can generate a search result based on user information including the user's demographic information, the user's intent, and/or the user's personalized information. After the search result is generated by the one or more search engines 304, it can be provided to the user 308.

Figure 13:
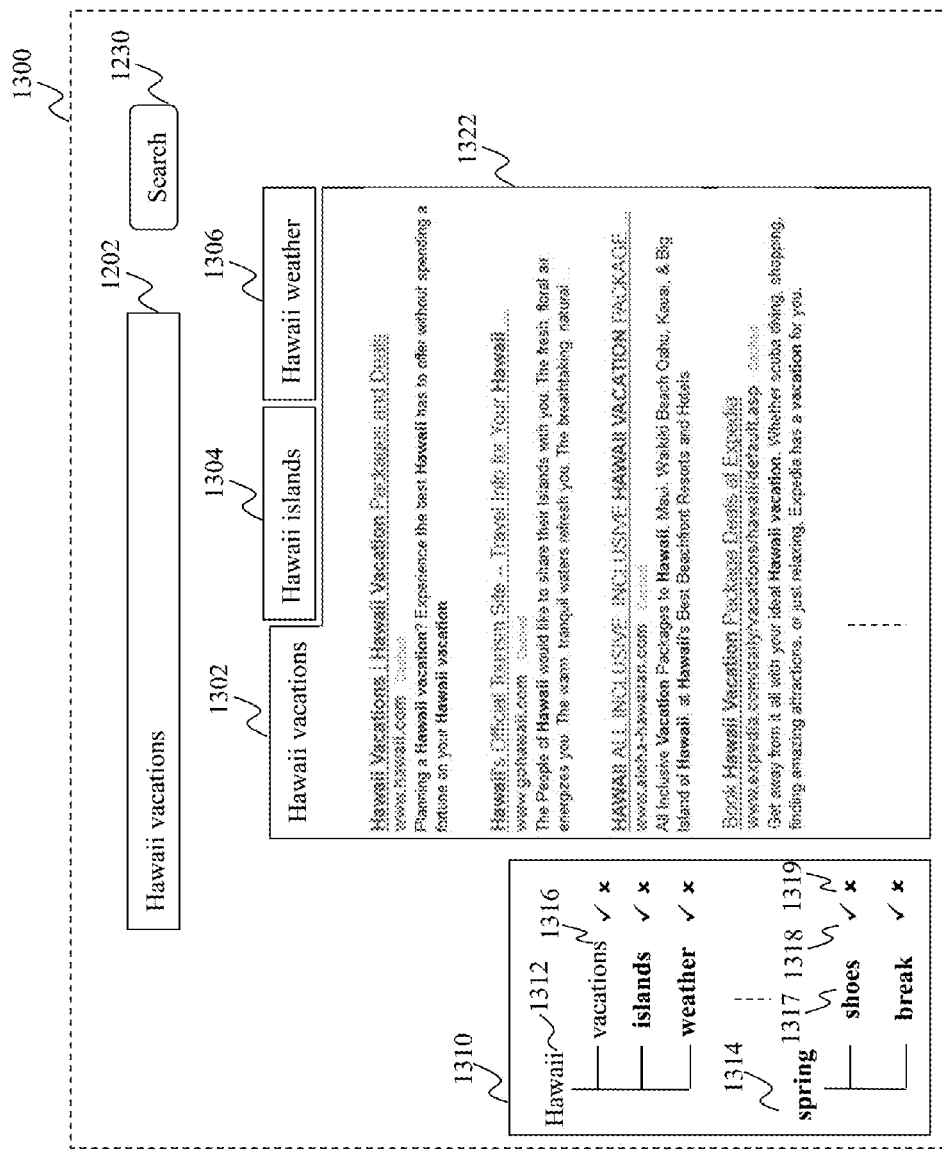
FIG. 13 depicts another exemplary web page on which a search result is provided based on user selection of query suggestions, according to an embodiment of the present teaching.

FIG. 13 depicts another exemplary web page 1300 on which a search result 1322 is provided based on user selection of query suggestions, according to an embodiment of the present teaching. In this example, a user, e.g. the user 1108-1, has selected query suggestions "Hawaii vacations" 1302, "Hawaii islands" 1304, and "Hawaii weather" 1306, each corresponds to a tab in the web page 1300. Based on the user's request, a search result 1322 corresponding to the selected query suggestion "Hawaii vacations" 1302 has been generated and displayed on the web page 1300. This may be because "Hawaii vacations" 1302 is the first query suggestion selected by the user 1108-1, among the three selected query suggestions "Hawaii vacations" 1302, "Hawaii islands" 1304, and "Hawaii weather" 1306. Correspondingly, the selected query suggestion "Hawaii vacations" is displayed in the search box 1202.

In one embodiment, a search result may be generated and provided to the user 1108-1 based on a plurality of query suggestions selected by the user 1108-1, e.g., based on both "Hawaii vacations" 1302 and "Hawaii islands" 1304. In another embodiment, a plurality of search results each generated based on a selected query suggestion may be displayed to the user 1108-1 at the same time on a same web page. In the embodiment shown in FIG. 13, the user 1108-1 may click on other tabs "Hawaii islands" 1304 or "Hawaii weather" 1306 to view search results corresponding to other selected query suggestions. Alternatively, the user 1108-1 may enter a new query in the search box 1202 for another search.

As described above, after the user 1108-1 selected query suggestions "Hawaii vacations" 1302, "Hawaii islands" 1304, and "Hawaii weather" 1306, these query suggestions are stored in the search bin 730-1 associated with the user 1108-1, as shown in FIG. 11. The three selected query suggestions are in a bold font in FIG. 11 to indicate that they were newly added in the search bin 730-1. After the user 1108-1 deselected query suggestions "Hawaii tsunami" and "Hawaii hotels", these query suggestions are stored in the trash bin 732-1 associated with the user 1108-1, as shown in FIG. 11. The two deselected query suggestions are in a bold font in FIG. 11 to indicate that they were newly added in the trash bin 732-1.

Back to FIG. 3 again, the search controller 302 may send a search bin request to the query suggestion engine 104 and retrieve a search bin corresponding to a user with the query suggestions stored therein, based on user information associated with the user. For example, if the user 1108-1 requests a search result as shown in FIG. 13, the search bin 730-1 associated with the user 1108-1 can be retrieved by the search controller 302 from the user selected suggestion database 730 shown in FIG. 11.

As shown in FIG. 13, the retrieved search bin 730-1 can be provided to the user 1108-1 in a search bin box 1310 together with the requested search result 1322. While the search bin box 1310 is displayed on the left of the search result 1322 in this example, in other examples however, the search bin box 1310 can be displayed at any other positions one the web page 1300 including the search result 1322. In another embodiment, the search bin box 1310 is displayed on a pop-up window other than the web page 1300 including the search result 1322. In yet another embodiment, the search bin box 1310 is minimized, e.g. as an icon, on the web page 1300 until the user expands the search bin box 1310, e.g. by clicking on the icon.

Under the prefix "Hawaii"1312 in the search bin box 1310, the two query suggestions "Hawaii islands" and "Hawaii weather" are in a bold font to indicate that the user 1108-1 has not viewed the search results corresponding to these two query suggestions. In contrast, the query suggestion "Hawaii vacations" 1316 is not in a bold font because the search result 1322 corresponding to the query suggestion has been displayed to the user 1108-1. Under the prefix "spring" 1314 in the search bin box 1310, the query suggestions "spring shoes" and "spring break" are also in a bold font to indicate that the user 1108-1 has not viewed the search results corresponding to these query suggestions previously selected and stored in the search bin 730-1. The user 1108-1 might stop searching activities after selecting the two query suggestions "spring shoes" and "spring break" sometime before, without viewing the search results corresponding to the two query suggestions.

In the search bin box 1310, there is a pair of select symbol ("✓") 1318 and deselect symbol ("x") 1319 corresponding to each query suggestion displayed therein. The user 1108-1 may click on a select symbol 1318 to keep the corresponding query suggestion in the search bin 730-1 and/or to view a search result based on the corresponding query suggestion. The user 1108-1 may click on a deselect symbol 1319 to delete the corresponding query suggestion from the search bin 730-1 and/or put the corresponding query suggestion into the trash bin 732-1. The user 1108-1 may also click directly on a query suggestion displayed in the search bin box 1310, e.g. the query suggestion "spring shoes" 1317, to view a search result based on the query suggestion. Once a search result based on a query suggestion in the search bin 730-1 has been displayed to the user 1108-1, the query suggestion may be deleted from the search bin 730-1 automatically, or the query suggestion may be kept in the search bin 730-1 for a predetermined period of time unless the user 1108-1 deletes the query suggestion from the search bin 730-1, e.g., by clicking on a deselect symbol 1319 corresponding to the query suggestion.

Figure 4:
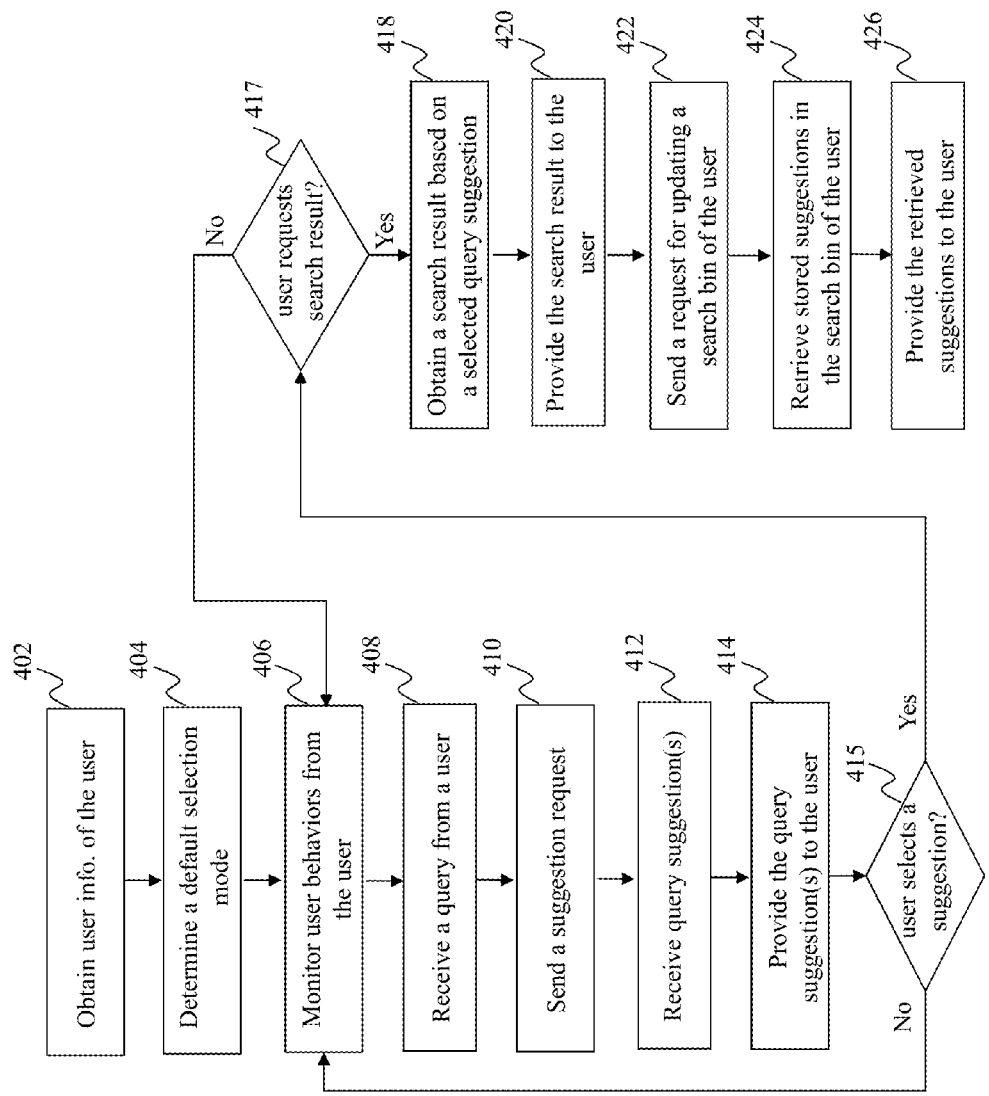
FIG. 4 is a flowchart of an exemplary process for providing a search result based on user selection of query suggestions, according to an embodiment of the present teaching.

FIG. 4 is a flowchart of an exemplary process for providing a search result based on user selection of query suggestions, according to an embodiment of the present teaching. In one example, the exemplary process in FIG. 4 may be performed by the search serving engine 102 shown in FIG. 3. Starting at 402, user information associated with a user is obtained, e.g., by the search serving engine 102. Moving to 404, a default selection mode is determined based on the obtained user information that may include information related to a device being used by the user to connect to the search serving engine 102. At 406, user behaviors are monitored and obtained from the user, according to the determined default selection mode. In one embodiment, the step at 406 will continue, i.e., user behaviors of the user will be kept monitored, after 406 and during the exemplary process.

At 408, a query or a query prefix (e.g., the first character of a query) is received from the user. Moving to 410, a suggestion request is sent to the query suggestion engine 104 based on the query or query prefix. At 412, one or more query suggestions are received from the query suggestion engine 104 based on the query or query prefix. Then at 414, the one or more query suggestions are provided to the user.

At 415, whether the user selects a query suggestion is checked, e.g., based on the user behaviors monitored. If so, the process proceeds to 417. Otherwise, the process goes back to 406 to continue monitoring user behaviors of the user. At 417, whether the user requests a search result based on a selected query suggestion is checked, e.g., based on the user behaviors monitored. If so, at 418, a search result is obtained based on the selected query suggestion. Otherwise, the process goes back to 406 to continue monitoring user behaviors of the user.

Moving to 420, the search result is provided to the user. At 422, a request is sent to the query suggestion engine 104 for updating a search bin and/or a trash bin associated with the user or generating a new search bin and/or a new trash bin associated with the user. For example, if the user has an associated search bin and selects a query suggestion, the associated search bin will be updated to store the selected query suggestion. Otherwise, if the user is new and does not have an associated search bin, a new search bin and a new trash bin will be generated and associated with the user. At 424, one or more query suggestions stored in the search bin associated with the user are retrieved. At 426, the retrieved one or more query suggestions are provided to the user. In one example, the search result in 420 and the retrieved one or more query suggestions in 426 can be provided to the user at the same time via a same web page or web application.

Figure 5:
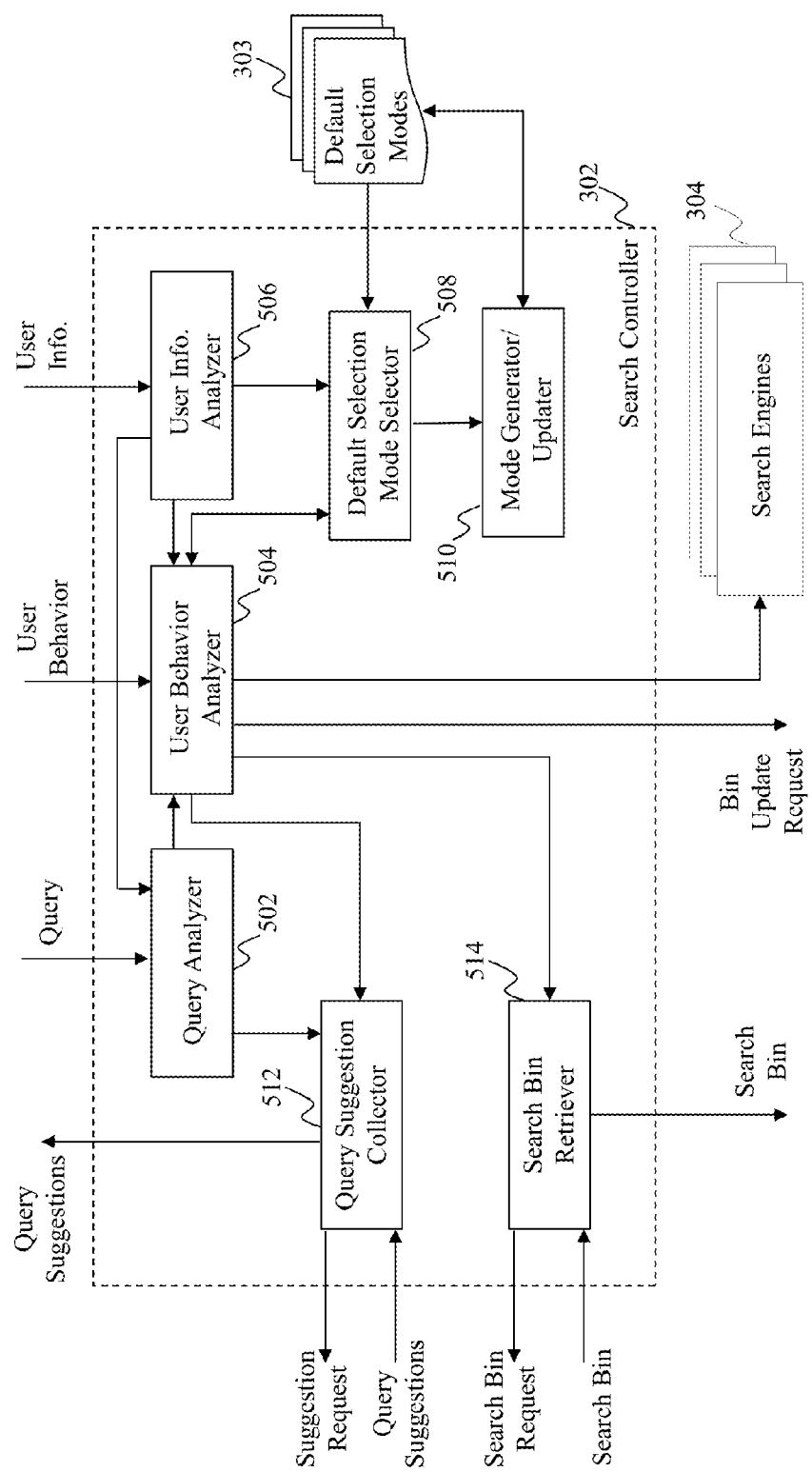
FIG. 5 illustrates an exemplary diagram of a search controller in a search serving engine, according to an embodiment of the present teaching.

FIG. 5 illustrates an exemplary diagram of a search controller 302 in a search serving engine, according to an embodiment of the present teaching. The search controller 302 may be in the search serving engine 102 shown in FIG. 3. The search controller 302 in this example includes a query analyzer 502, a user behavior analyzer 504, a user information analyzer 506, a default selection mode selector 508, a mode generator/updater 510, a query suggestion collector 512, and a search bin retriever 514.

The user information analyzer 506 in this example receives and analyzes user information from a user. The user information may include the user's login information and/or cookie information that can be utilized to identify the user. The user information may also include information related to the user's device, e.g., whether the user is using a laptop or a smartphone. The user information analyzer 506 sends the analyzed user information to the query analyzer 502, the user behavior analyzer 504, and the default selection mode selector 508.

The query analyzer 502 in this example receives and analyzes queries sent by the user. The query analyzer 502 can determine whether a query suggestion or a search result is needed for the user based on the user information analyzed by the user information analyzer 506. If a query suggestion is needed, e.g. after the user types a query or query prefix in a search box on a web site, the query analyzer 502 passes the query or query prefix along with the user information to the query suggestion collector 512 for collecting query suggestions from the query suggestion engine 104. In this case, the user information can be utilized to identify the user and determine the user's intent regarding the query, so that query suggestions matching the user's intent can be generated and provided to the user. If a search result is needed, e.g. after the user selects a query suggestion, the query analyzer 502 passes the selected query suggestion along with the user information to the user behavior analyzer 504 for determining whether and when to perform searching based on the user's behaviors. In this case, the user information can be utilized to identify the user and determine the user's intent regarding the query, so that when the user wants a search, a search result matching the user's intent can be generated and provided to the user.

The user behavior analyzer 504 in this example receives and analyzes the user's behaviors based on the user information analyzed by the user information analyzer 506 and a default selection mode selected by the default selection mode selector 508. The default selection mode selector 508 in this example selects one of the default selection modes 303 based on the user information analyzed by the user information analyzer 506. In one scenario, if the user 308 is using a laptop, a default selection mode can be selected so that the user behavior analyzer 504 can monitor keyboard inputs and/or mouse clicks from the user to determine whether the user 308 selects a query suggestion, whether the user 308 deselects a query suggestion, whether the user 308 finishes selection of query suggestions, and whether the user 308 intends to start searching regarding the selected query suggestions. In another scenario, if the user 308 is using a mobile device, e.g., a smartphone or a tablet, with a touchscreen, another default selection mode can be selected so that the user behavior analyzer 504 can monitor finger clicks, pressing down, and swipes from the user 308 to determine whether the user 308 selects a query suggestion, whether the user 308 deselects a query suggestion, whether the user 308 finishes selection of query suggestions, and whether the user 308 intends to start searching regarding the selected query suggestions. For example, a query suggestion is determined to be selected by the user 308, when the user 308 presses down the query suggestion for a period of time longer than a predetermined threshold. For another example, a query suggestion is determined to be selected by the user 308, when the user 308 swipes the query suggestion right to left; and a query suggestion is determined to be deselected by the user 308, when the user 308 swipes the query suggestion left to right.

The mode generator/updater 510 in this example generates a new default selection mode or updates an existing default selection mode, based on instructions from the default selection mode selector 508. The instructions may be based on new or updated user information received by the user information analyzer 506. The instructions may also be generated when the user behavior analyzer 504 has not detected any user behavior from the user 308 for a time period longer than a predetermined threshold.

The user behavior analyzer 504 may determine that a query suggestion is needed based on user behaviors detected therein. For example, the user 308 may click a button "more suggestions" on a web site to request for more query suggestions. In that case, the user behavior analyzer 504 will pass the request to the query suggestion collector 512 for collecting query suggestions from the query suggestion engine 104.

The query suggestion collector 512 in this example collects query suggestions from the query suggestion engine 104, based on the query received at the query analyzer 502 and a request from either the query analyzer 502 or the user behavior analyzer 504. The query suggestion collector 512 sends a suggestion request to the query suggestion engine 104 for one or more query suggestions. The suggestion request includes information related to the user information, the query received at the query analyzer 502, and/or user behavior information received at the user behavior analyzer 504. After the query suggestion collector 512 receives query suggestions from the query suggestion engine 104, it may provide the query suggestions to the user 308.

From the provided query suggestions, the user 308 may select one or more query suggestions. The user behavior analyzer 504 may detect that the user 308 has selected a query suggestion, according to a default selection mode. In that case, the user behavior analyzer 504 may send a bin update request to the query suggestion engine 104 for updating a search bin and/or a trash bin corresponding to the user 308 or generating a new search bin and/or a trash bin for the user 308 if the user 308 is a new user. The bin update request may include information about the selected query suggestion. Therefore, the query suggestion engine 104 may store the selected query suggestion into a search bin corresponding to the user 308 after receiving the bin update request from the user behavior analyzer 504. In some embodiments, the bin update request may be sent by the user behavior analyzer 504 based on a query suggestion, when a user deselects the query suggestion or when the user finishes searching activity regarding the query suggestion. Then the query suggestion can be deleted from the search bin corresponding to the user and/or put into the trash bin corresponding to the user.

After selecting one or more query suggestions, the user 308 may request a search result regarding at least some of the selected one or more query suggestions. The request may be detected as a user behavior at the user behavior analyzer 504. For example, the user behavior analyzer 504 may determine that the user 308 wants a search result when the user 308 clicks on a "search" button shown in FIG. 12A or when the user behavior analyzer 504 does not detect any input from the user 308 for a period of time (e.g., five seconds) after the user 308 selects a query suggestion.

After determining that a search result is requested by the user 308, the user behavior analyzer 504 may send a search request to the one or more search engines 304 for generating a search result based on the search request. The search request may include information related to the query suggestion selected by the user 308. The search request may also include user information associated with the user 308 to indicate a topic the user 308 is interested in so that the one or more search engines 304 may only run a search within a vertical content source corresponding to that topic. After a search result is generated by the one or more search engines 304, it can be provided to the user 308.

The user behavior analyzer 504 may also send a request to the search bin retriever 514 for retrieving a search bin associated with the user 308. Then the search bin retriever 514 in this example sends a search bin request to the query suggestion engine 104 and retrieves a corresponding search bin associated with the user 308 with the query suggestions stored therein. In one case, the search bin request may be sent after determining that a search result is requested by the user 308, so that the retrieved search bin can be provided to the user 308 together with the requested search result. In another case, the search bin request may be sent once the user information associated with the user 308 is received at the user information analyzer 506, so that the user 308 can see query suggestions previously selected and stored in the user's corresponding search bin immediately after logging in. After retrieving the corresponding search bin, the search bin retriever 514 provides the retrieved search bin to the user 308.

Figure 6:
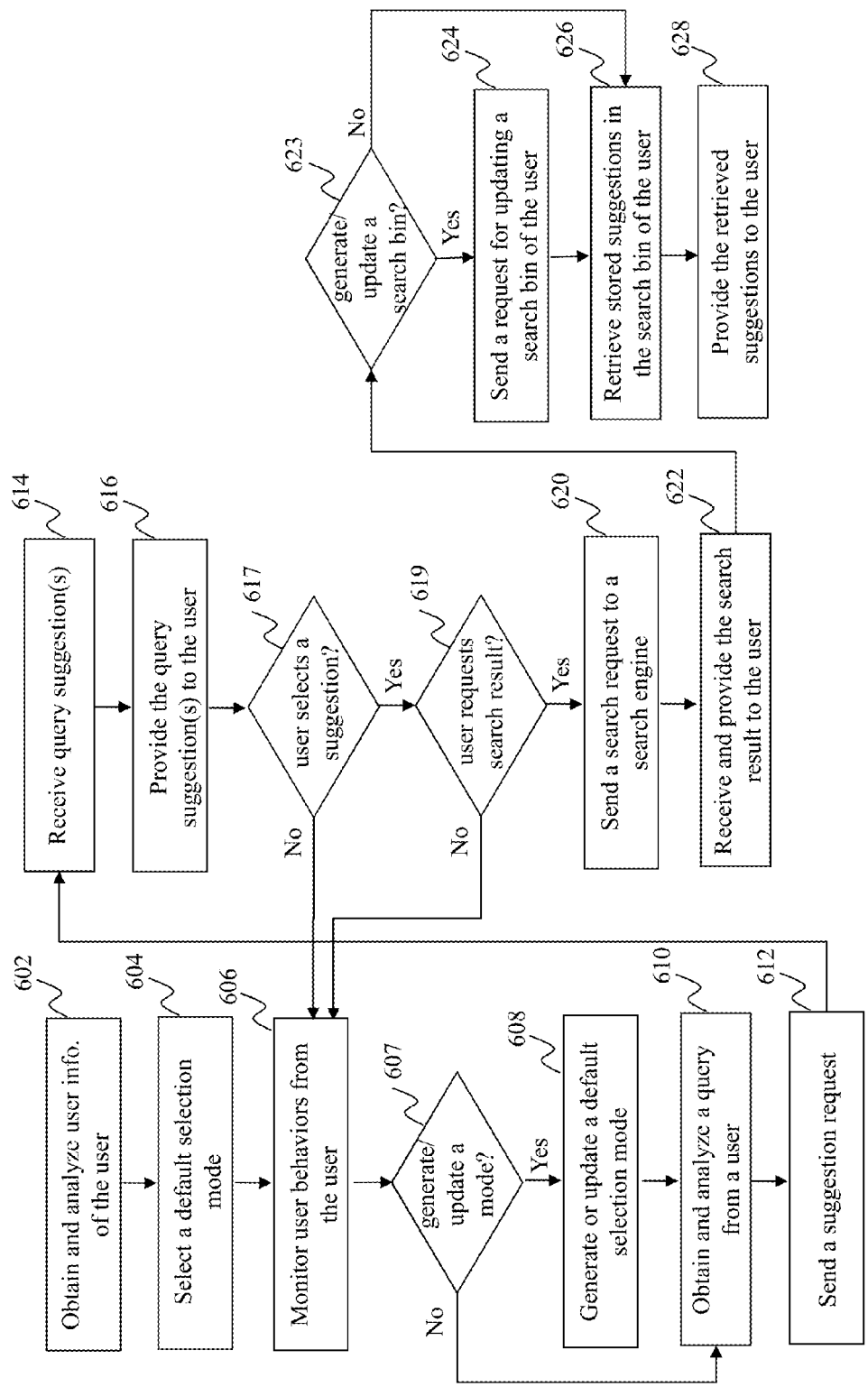
FIG. 6 is a flowchart of an exemplary process performed by a search controller, according to an embodiment of the present teaching.

FIG. 6 is a flowchart of an exemplary process performed by a search controller, e.g., the search controller 302 in FIG. 5, according to an embodiment of the present teaching. Starting at 602, user information associated with a user is obtained and analyzed, e.g., by the query analyzer 502. Moving to 604, a default selection mode is selected based on the obtained user information that may include information related to a device being used by the user to communicate with the search controller 302. At 606, user behaviors associated with the user are monitored and obtained from the user, according to the selected default selection mode. In one embodiment, the step 606 will continue, i.e., user behaviors of the user will be kept monitored, after 606 and during the exemplary process in FIG. 6.

At 607, whether to generate or update a default selection mode is determined, e.g., based on the user behaviors monitored or when no user behavior has been detected from the user for a time period longer than a predetermined threshold. If so, at 608, the default selection mode is generated or updated. Otherwise, the process goes directly to 610, where a query or a query prefix (e.g., the first character of a query) is received from the user and analyzed. Moving to 612, a suggestion request is sent to the query suggestion engine 104 based on the query or query prefix. At 614, one or more query suggestions are received from the query suggestion engine 104 based on the query or query prefix. Then at 616, the one or more query suggestions are provided to the user.

At 617, whether the user selects a query suggestion is checked, e.g., based on the user behaviors monitored. If so, the process proceeds to 619. Otherwise, the process goes back to 606 to continue monitoring user behaviors of the user. At 619, whether the user requests a search result based on a selected query suggestion is checked, e.g., based on the user behaviors monitored. If so, at 620, a search request is sent to a search engine for performing a search based on the selected query suggestion. Otherwise, the process goes back to 606 to continue monitoring user behaviors of the user. Moving to 622 from 620, a search result is received from the search engine and provided to the user.

At 623, whether to generate or update a search bin (and/or a trash bin) is determined, e.g., based on the user behaviors monitored. If so, at 624, a request is sent to the query suggestion engine 104 for updating a search bin (and/or a trash bin) associated with the user or generating a new search bin (and/or a new trash bin) associated with the user. Otherwise, the process goes directly to 626, where one or more query suggestions stored in the search bin associated with the user are retrieved. In one embodiment, a search bin associated with a user can be updated right after the user selects a query suggestion at 617. In another embodiment, a search bin associated with a user may not need to be updated when the user has viewed search results for all query suggestions selected at 617 so that the query suggestions do not need to be stored in the search bin. At 628, the retrieved one or more query suggestions are provided to the user. In one example, the search result in 622 and the retrieved one or more query suggestions in 628 can be provided to the user at the same time via a same web page or web application.

Figure 7:
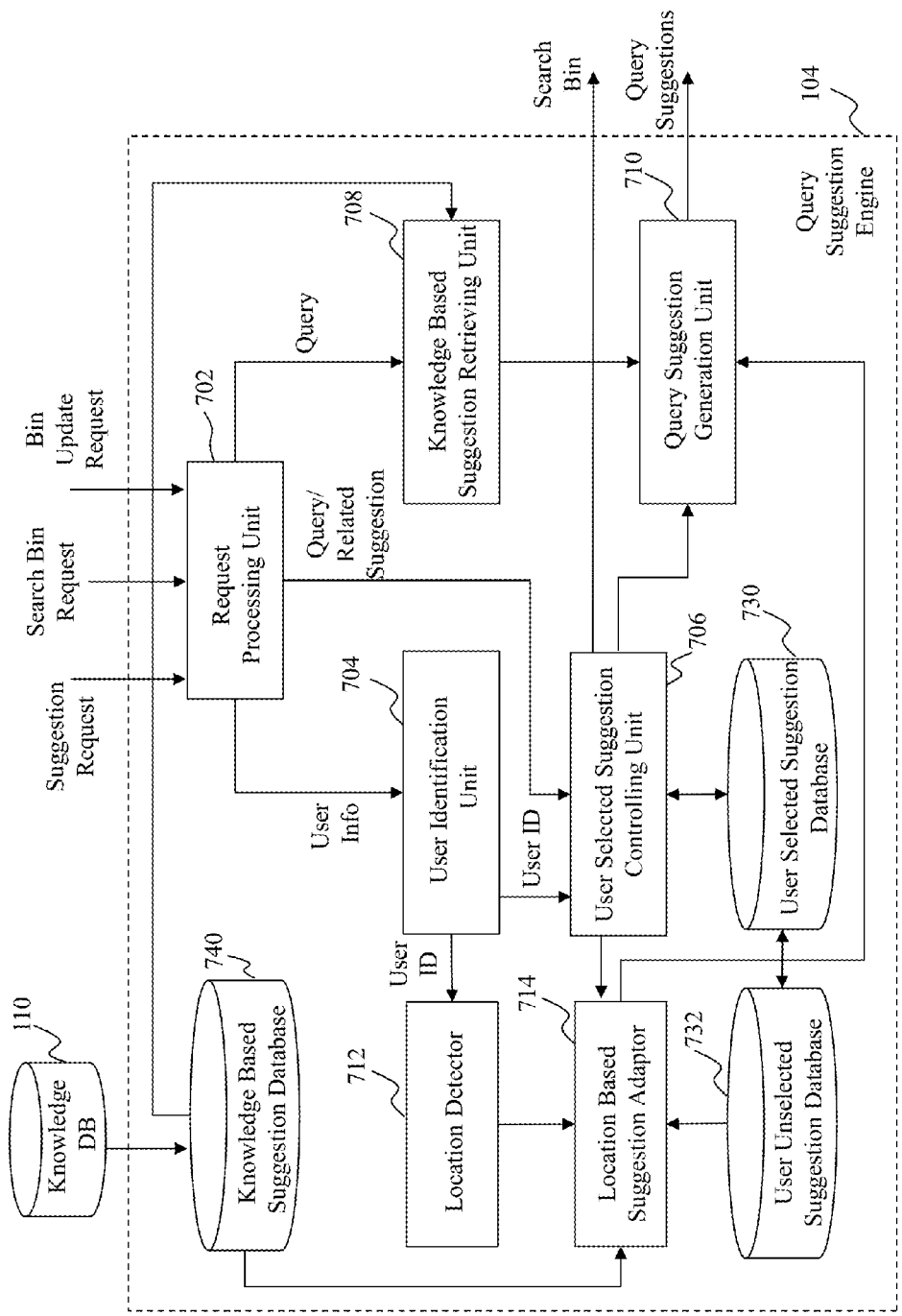
FIG. 7 illustrates an exemplary diagram of a query suggestion engine in a system for providing a search result based on user selection of query suggestions, according to an embodiment of the present teaching.

FIG. 7 illustrates an exemplary diagram of a query suggestion engine 104 in a system, e.g., system 100 in FIG. 1 or system 200 in FIG. 2, for providing a search result based on user selection of query suggestions, according to an embodiment of the present teaching. The query suggestion engine 104 in this example includes a request processing unit 702, a user identification unit 704, a user selected suggestion controlling unit 706, a knowledge based suggestion retrieving unit 708, a query suggestion generation unit 710, a location detector 712, and a location based suggestion adaptor 714. The request processing unit 702 in this example receives a request from the search serving engine 102. In a first example, the request is a bin update request which includes a related suggestion and user information. In the first example, the request processing unit 702 is responsible for sending the user information to the user identification unit 704 in order to identify a unique user ID and sending the related suggestion to the user selected suggestion controlling unit 706 for updating a search bin and/or a trash bin associated with the unique user ID. The related suggestion may be a query suggestion selected or deselected by the user. In a second example, the request is a search bin request which includes user information. In the second example, the request processing unit 702 is responsible for sending the user information to the user identification unit 704 in order to identify the unique user ID and retrieve a corresponding search bin based on the user ID. In a third example, the request is a suggestion request which includes a query (or a query prefix) and user information. In the third example, the request processing unit 702 is responsible for sending the user information to the user identification unit 704 in order to identify the unique user ID and sending the query to the user selected suggestion controlling unit 706 and the knowledge based suggestion retrieving unit 708 for generating query suggestions. The user information may include the user's login information and/or cookie information.

The user identification unit 704 is configured to determine the unique user ID based on the user's login information and/or cookie information and send the unique user ID to the user selected suggestion controlling unit 706 and the location detector 712. The query suggestion engine 104 in this embodiment also includes a user selected suggestion database 730, a user unselected suggestion database 732, and a knowledge based suggestion database 740.

In the first example described before, the user selected suggestion controlling unit 706 is configured for identifying a search bin in the user selected suggestion database 730 and/or a trash bin in the user unselected suggestion database 732 based on the unique user ID received from the user identification unit 704 and updating the search bin and/or the trash bin based on the related suggestion received from the request processing unit 702. In one case, when the user selects a query suggestion, the user selected suggestion controlling unit 706 updates a search bin associated with the user by storing the selected query suggestion into the search bin. In another case, when the user deselects a query suggestion, the user selected suggestion controlling unit 706 updates a trash bin associated with the user by storing the deselected query suggestion into the trash bin.

In the second example described before, the user selected suggestion controlling unit 706 is configured for identifying a search bin in the user selected suggestion database 730 based on the unique user ID received from the user identification unit 704, retrieving the search bin which includes the query suggestions previously selected by the user and stored therein, and sending the retrieved search bin to the search serving engine 102. In one embodiment, the user selected suggestion controlling unit 706 may also retrieve a trash bin which includes the query suggestions previously deselected by the user and stored therein, upon receiving a trash bin request from a user or a system manager.

In the third example described before, the user selected suggestion controlling unit 706 is configured for identifying a search bin in the user selected suggestion database 730 based on the unique user ID and the query received from the user identification unit 704, retrieving one or more query suggestions stored in the search bin that are related to the query, and sending the retrieved one or more query suggestions to the query suggestion generation unit 710 and the location based suggestion adaptor 714. The query suggestion generation unit 710 may be configured for generating query suggestions based at least partially on the one or more query suggestions sent by the user selected suggestion controlling unit 706 and sending the generated query suggestions to the search serving engine 102. The query suggestions sent to the search serving engine 102 may also be generated based on some knowledge based suggestions and/or some location based suggestions.

If the query suggestion generation unit 710 determines to take into consideration knowledge based suggestions, it may send a request to the knowledge based suggestion retrieving unit 708. The knowledge based suggestion retrieving unit 708 may be configured for receiving the query from the request processing unit 702, retrieving a knowledge based query suggestion from the knowledge based suggestion database 740 based on the query, and sending the knowledge based query suggestion to the query suggestion generation unit 710. The knowledge based suggestion database 740 includes query suggestions generated based on some knowledge retrieved from the knowledge database 110. The query suggestions stored in the knowledge based suggestion database 740 may not be selected or deselected by a user before. The numbers of retrieved user selected suggestions and knowledge based suggestions may be predetermined or dynamically adjusted based on the number of characters in the query. For example, as more characters in the query are typed in, the numbers of user selected suggestions and knowledge based suggestions may be reduced as the candidates are narrowed down. Both the retrieved user selected suggestions and knowledge based suggestions are fed into the query suggestion generation unit 710.

In one embodiment, the knowledge based suggestion retrieving unit 708 may also receive user information from the request processing unit 702, so that the knowledge based suggestions can be retrieved based on user information including the user's demographic information, the user's intent, and/or the user's personalized information.

If the query suggestion generation unit 710 also determines to take into consideration some location based suggestions, it may send a request to the location based suggestion adaptor 714. The location based suggestion adaptor 714 may be configured for generating one or more location based suggestions for modifying the query suggestions generated at the query suggestion generation unit 710. The location based suggestion adaptor 714 can receive location information associated with the user that is detected by the location detector 712 based on the user ID sent from the user identification unit 704. The location based suggestion adaptor 714 may generate some location based suggestions based on the detected location of the user and the query passed by the user selected suggestion controlling unit 706.

Figure 12B:
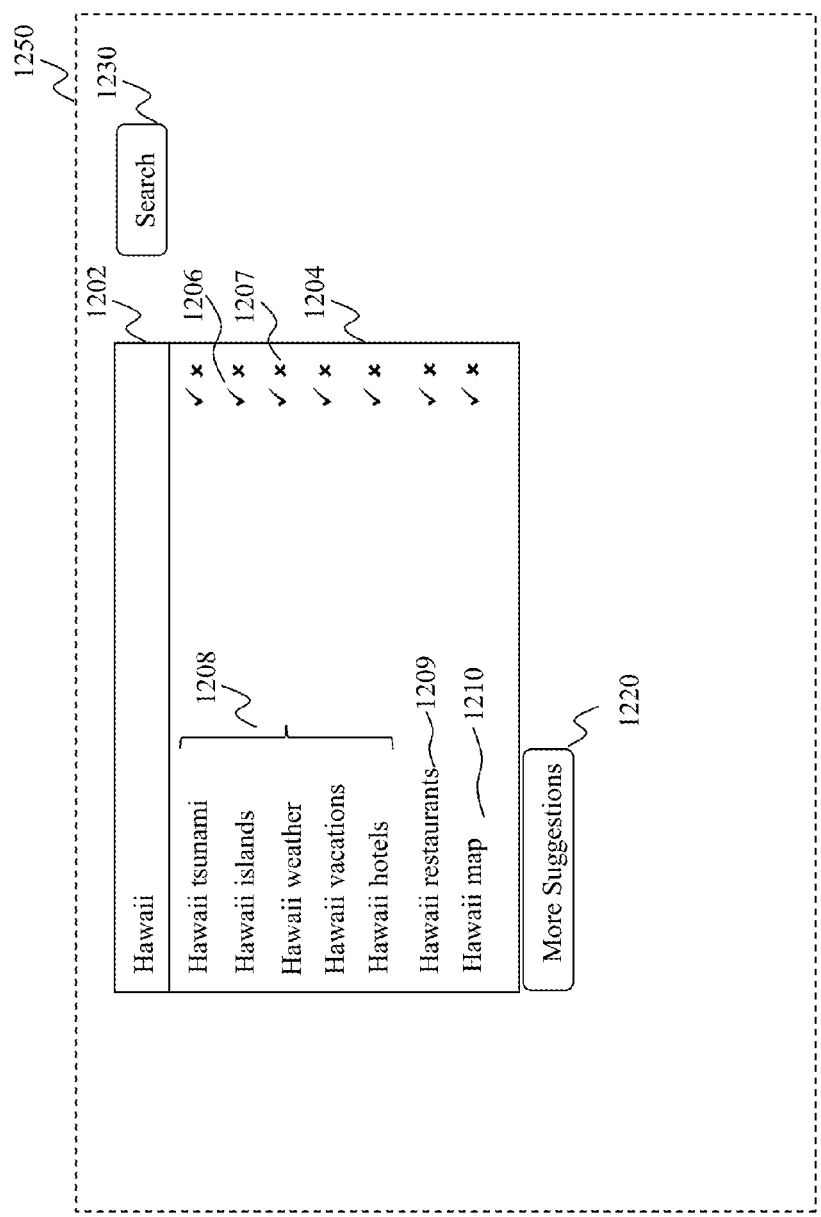
FIG. 12B depicts another exemplary web page on which a list of query suggestions is provided, according to an embodiment of the present teaching.

FIG. 12B depicts another exemplary web page 1250 on which a list of query suggestions 1208, 1209, 1210 is provided, according to an embodiment of the present teaching. In this example, the first five query suggestions 1208 may be generated based on the retrieved user selected suggestions and/or knowledge based suggestions, without considering location information associated with the user. The other two query suggestions "Hawaii restaurants" 1209 and "Hawaii map" 1210 are generated based on location information associated with the user, e.g., after detecting that the user is currently located in Hawaii.

Back to FIG. 7, in one example, the location based suggestion adaptor 714 may send adaptive information to the query suggestion generation unit 710 for modifying the query suggestions generated at the query suggestion generation unit 710. In one case, the adaptive information includes the location based suggestions to be added to the query suggestions at the query suggestion generation unit 710, as illustrated in the example in FIG. 12B. In another case, the adaptive information includes information from the user unselected suggestion database 732 to delete a query suggestion from the query suggestions generated at the query suggestion generation unit 710, if the user has deselected the query suggestion. In yet another case, the adaptive information includes information from the knowledge based suggestion database 740 to allow the query suggestions generated at the query suggestion generation unit 710 be modified and/or ranked based on knowledge information from the knowledge based suggestion database 740.

The query suggestion generation unit 710 may further filter and rank the blended query suggestions based on the inputs from the user selected suggestion controlling unit 706, the knowledge based suggestion retrieving unit 708, and the location based suggestion adaptor 714, and return the blended query suggestions to the search serving engine 102 as a response to the suggestion request. In one example, the blended query suggestions may be ranked such that the retrieved user selected query suggestions are ranked higher than other query suggestions. In another example, query suggestions in the same category, e.g., user selected query suggestions, are ranked based on time, i.e., more recently selected query suggestions are ranked higher.

Figure 8:
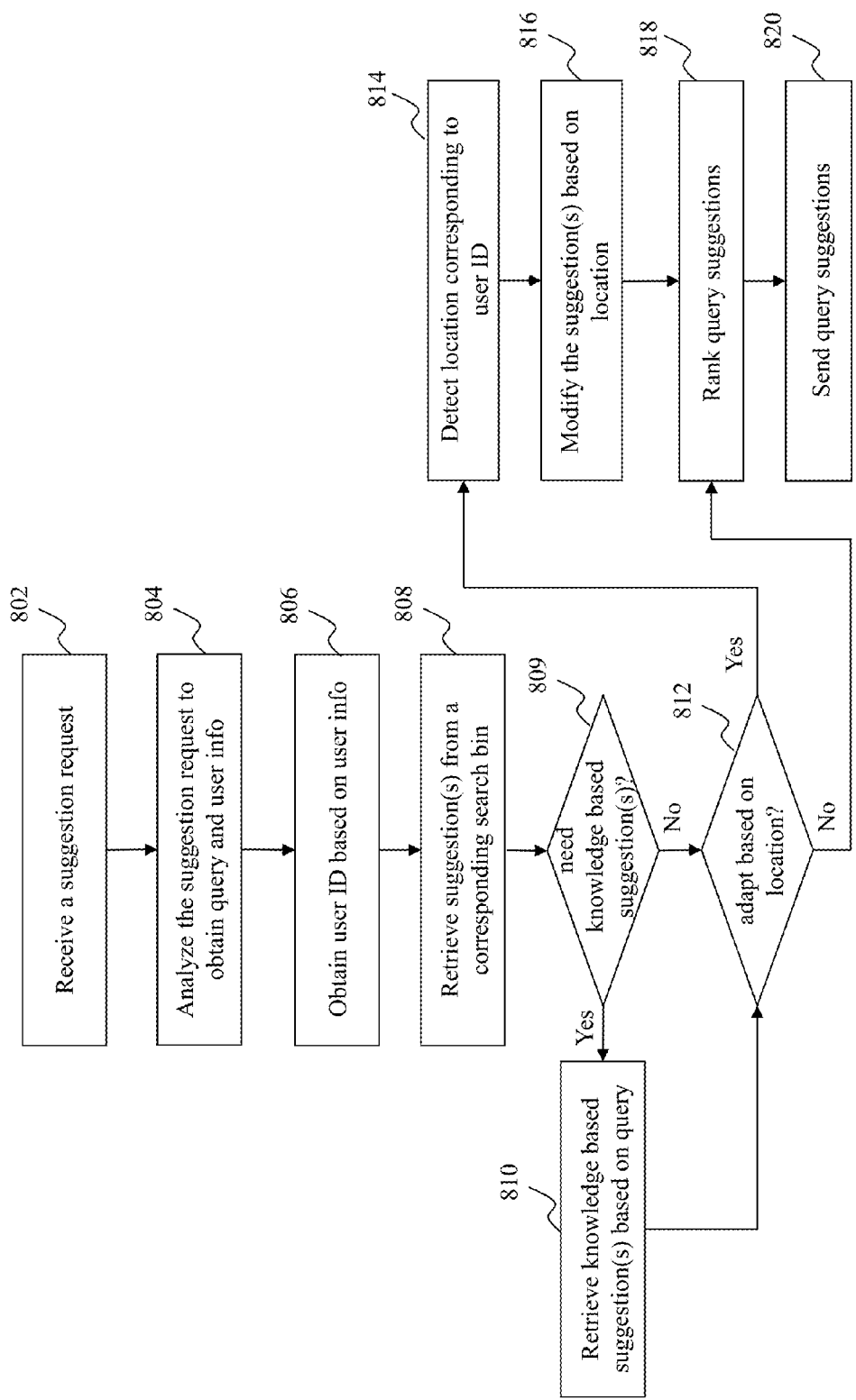
FIG. 8 is a flowchart of an exemplary process performed by a query suggestion engine, according to an embodiment of the present teaching.

FIG. 8 is a flowchart of an exemplary process performed by a query suggestion engine, e.g., the query suggestion engine 104 in FIG. 7, according to an embodiment of the present teaching. Starting at 802, a suggestion request is received. Moving to 804, the suggestion request is analyzed to obtain a query from a user and user information associated with the user. At 806, a user ID is obtained based on the user information. At 808, one or more query suggestions are retrieved from a corresponding search bin associated with the user based on the user ID.

At 809, whether to utilize knowledge based query suggestions is determined, e.g., based on the number and availability of the retrieved query suggestions from the corresponding search bin. If so, at 810, the knowledge based query suggestions are generated and retrieved based on the query. Otherwise, the process goes directly to 812, where whether to adapt or modify the query suggestions based on location information is determined, e.g., based on the numbers and availability of the retrieved query suggestions from the corresponding search bin and/or the retrieved knowledge based query suggestions. If so, at 814, location information associated with the user is detected based on the user ID. Then at 816, the query suggestions can be modified based on the location information. In one embodiment, the query suggestions can also be modified based on the information related to knowledge and the user's de-selection activities. If it is determined otherwise at 812, the process proceeds directly to 818, where the modified query suggestions are ranked. At 820, the ranked query suggestions are sent to the search serving engine 102 as a response to the suggestion request.

Figure 9:
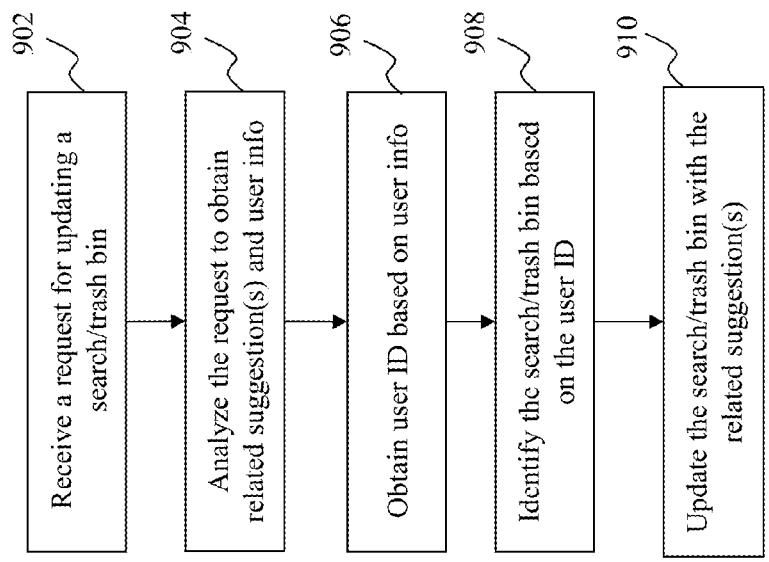
FIG. 9 is a flowchart of another exemplary process performed by a query suggestion engine, according to an embodiment of the present teaching.

FIG. 9 is a flowchart of another exemplary process performed by a query suggestion engine, e.g., the query suggestion engine 104 in FIG. 7, according to an embodiment of the present teaching. Starting at 902, a bin update request is received for updating a search bin and/or a trash bin. Moving to 904, the bin update request is analyzed to obtain one or more related suggestions from a user and user information associated with the user. At 906, a user ID is obtained based on the user information. At 908, the search bin and/or the trash bin are identified based on the user ID. At 910, the identified search bin and/or the trash bin are updated with the one or more related suggestions. In one example, the related suggestions are query suggestions selected by the user, and thus the search bin is updated to include the selected query suggestions in the search bin. In another example, the related suggestions are query suggestions deselected by the user, and thus the trash bin is updated to include the deselected query suggestions in the trash bin.

Figure 10:
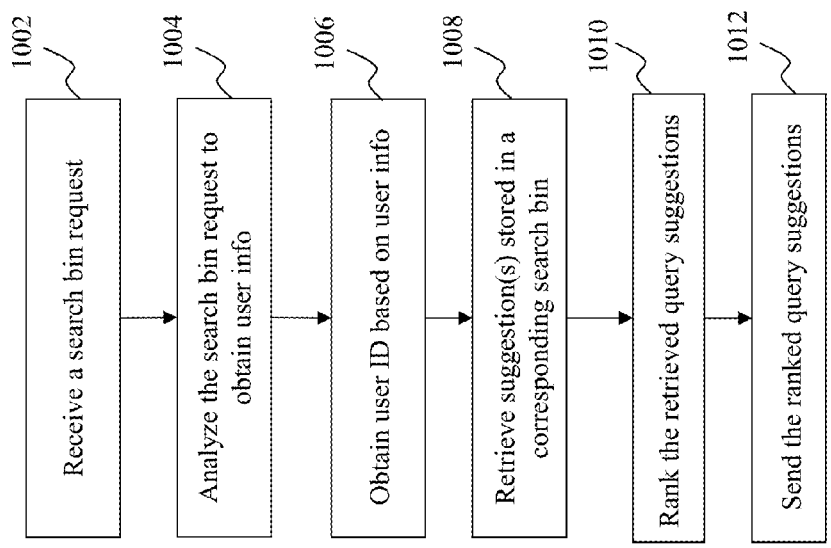
FIG. 10 is a flowchart of yet another exemplary process performed by a query suggestion engine, according to an embodiment of the present teaching.

FIG. 10 is a flowchart of yet another exemplary process performed by a query suggestion engine, e.g., the query suggestion engine 104 in FIG. 7, according to an embodiment of the present teaching. Starting at 1002, a search bin request is received. Moving to 1004, the search bin request is analyzed to obtain user information associated with a user to whom the search bin will be provided. At 1006, a user ID is obtained based on the user information. At 1008, query suggestions stored in a corresponding search bin is retrieved based on the user ID. At 1010, the retrieved query suggestions are ranked. At 1012, the ranked query suggestions are sent to the search serving engine 102 as a response to the search bin request.

Figure 14:
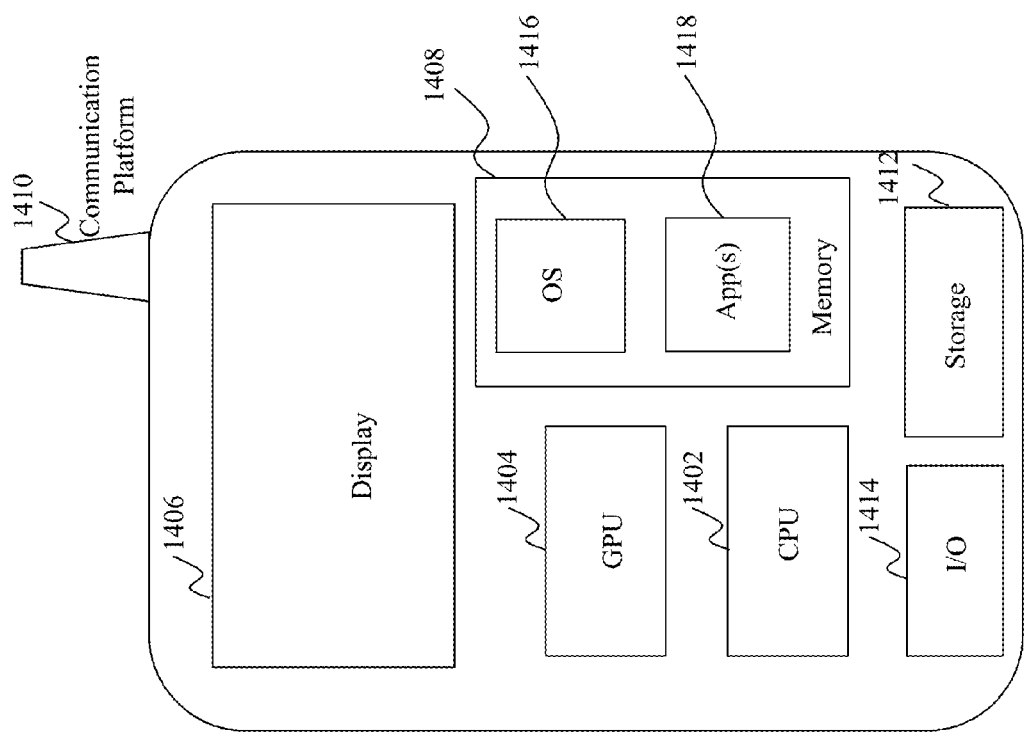
FIG. 14 depicts a general mobile device architecture on which the present teaching can be implemented.

FIG. 14 depicts a general mobile device architecture on which the present teaching can be implemented. In this example, the user device 108 is a mobile device 1400, including but is not limited to, a smart phone, a tablet, a music player, a handled gaming console, a GPS receiver. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, such as but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. The applications 1418 may include a web browser or any other suitable mobile search apps. Execution of the applications 1418 may cause the mobile device 1400 to perform some processing as described before. For example, the display of search suggestions and results is made by the GPU 1404 in conjunction with the display 1406. User inputs of search queries are received via the I/O devices 1414 and sent to the search serving engine 102 via the communication platform 1410.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
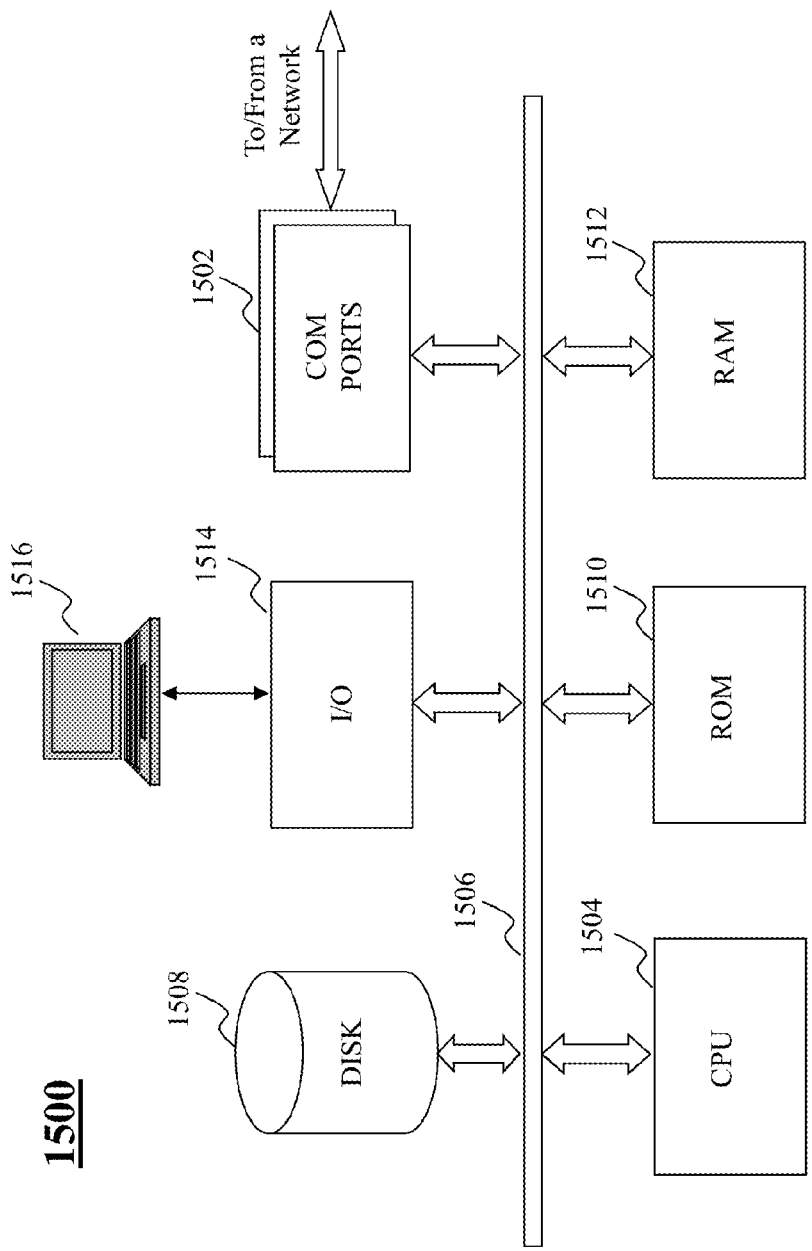
FIG. 15 depicts a general computer architecture on which the present teaching can be implemented.

FIG. 15 depicts a general computer architecture on which the present teaching can be implemented and has a functional block diagram illustration of a computer hardware platform that includes user interface elements. The computer may be a general-purpose computer or a special purpose computer. This computer 1500 can be used to implement any components of the search suggestion architecture as described herein. Different components of the system, e.g., as depicted in FIGS. 1 and 2, can all be implemented on one or more computers such as computer 1500, via its hardware, software program, firmware, or a combination thereof. Although only one such computer is shown, for convenience, the computer functions relating to search suggestion may be implemented in a distributed fashion on a number of similar platforms, to distribute the processing load.

The computer 1500, for example, includes COM ports 1502 connected to and from a network connected thereto to facilitate data communications. The computer 1500 also includes a CPU 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU 1504. The computer 1500 also includes an I/O component 1514, supporting input/output flows between the computer and other components therein such as user interface elements 1516. The computer 1500 may also receive programming and data via network communications.

Hence, aspects of the method of search suggestion, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which having at least one processor, storage, and a communication platform connected to a network for providing a search result, the method comprising:
   receiving a query from a user;
   obtaining a plurality of query suggestions generated based on the query;
   providing the plurality of query suggestions to the user;
   receiving a selection of more than one query suggestion from the plurality of query suggestions from the user;
   obtaining a first search result generated based on at least one of the more than one query suggestion; and
   providing the first search result to the user.

2. The method of claim 1, further comprising:
   obtaining user information associated with the user; and
   sending a request for updating a search record associated with the user based on the user information, wherein the search record includes one or more stored query suggestions previously selected by the user, and the search record is to be updated to include the more than one query suggestion based on the selection from the user.

3. The method of claim 2, further comprising:
   obtaining a retrieved query suggestion that is retrieved from the search record; and
   providing the retrieved query suggestion to the user, wherein the retrieved query suggestion is to be presented together with the first search result to the user.

4. The method of claim 3, wherein the retrieved query suggestion is one of the one or more stored query suggestions previously selected by the user and is different from the at least one of the more than one query suggestion.

5. The method of claim 3, further comprising:
   receiving a search request from the user in accordance with the retrieved query suggestion;
   obtaining a second search result generated based on the retrieved query suggestion; and
   providing the second search result to the user.

6. The method of claim 2, wherein the plurality of query suggestions is generated based at least partially on a query suggestion previously selected by the user and stored in the search record.

7. The method of claim 1, wherein receiving a selection of more than one query suggestion comprises:
   obtaining one or more user behaviors from the user;
   identifying the more than selected by the user based on the one or more user behaviors; and
   determining that the user has finished the selection.

8. A method, implemented on at least one machine each of which having at least one processor, storage, and a communication platform connected to a network for providing a query suggestion, the method comprising:
   receiving a query from a user;
   obtaining user information associated with the user;
   identifying a search record associated with the user based on the user information, wherein the search record stores query suggestions previously selected by the user;
   retrieving a plurality of query suggestions from the search record based on the query, wherein the plurality of query suggestions includes a first query suggestion;
   generating a second query suggestion based at least partially on the first query suggestion and the query; and
   providing the plurality of query suggestions and the second query suggestion to the user, wherein the user selects more than one query suggestion from the second query suggestion and the provided query suggestions.

9. The method of claim 8, wherein:
   the more than one query suggestion includes a third query suggestion; and
   a search result generated based on the third query suggestion is provided to the user.

10. The method of claim 9, further comprising:
    retrieving a fourth query suggestion from the search record; and
    providing the fourth query suggestion to the user, wherein the fourth query suggestion is to be presented together with the search result to the user.

11. The method of claim 10, wherein the fourth query suggestion is one of the more than one query suggestion.

12. The method of claim 8, further comprising:
    receiving a request for updating the search record associated with the user; and
    updating the search record to include the more than one query suggestion selected by the user.

13. The method of claim 8, wherein the second query suggestion is generated based on at least one of: the user information, knowledge related to the query, location information related to the user, and a query suggestion previously deselected by the user.

14. A system having at least one processor, storage, and a communication platform for providing a search result, the system comprising:
   a query analyzer configured for receiving a query from a user;
   a query suggestion collector configured for obtaining a plurality of query suggestions generated based on the query and providing the plurality of query suggestions to the user;
   a user behavior analyzer configured for receiving a selection of more than one query suggestion from the plurality of query suggestions from the user; and
   one or more search engines configured for obtaining a first search result generated based on at least one of the more than one query suggestion and providing the first search result to the user.

15. The system of claim 14, further comprising a user information analyzer configured for obtaining user information associated with the user, the user behavior analyzer further configured for sending a request for updating a search record associated with the user based on the user information, wherein
   the search record includes one or more stored query suggestions previously selected by the user, and
   the search record is to be updated to include the more than one query suggestion based on the selection from the user.

16. The system of claim 15, further comprising a search record retriever configured for:
   obtaining a retrieved query suggestion that is retrieved from the search record; and
   providing the retrieved query suggestion to the user, wherein the retrieved query suggestion is to be presented together with the first search result to the user.

17. The system of claim 16, wherein the retrieved query suggestion is one of the one or more stored query suggestions previously selected by the user and is different from the at least one of the more than one query suggestion.

18. The system of claim 16, wherein:
   the user behavior analyzer is further configured for receiving a search request from the user in accordance with the retrieved query suggestion; and
   the one or more search engines are further configured for
   obtaining a second search result generated based on the retrieved query suggestion, and
   providing the second search result to the user.

19. The system of claim 15, wherein the plurality of query suggestions is generated based at least partially on a query suggestion previously selected by the user and stored in the search record.

20. The system of claim 14, wherein the user behavior analyzer is further configured for:
   obtaining one or more user behaviors from the user;
   identifying the more than one query suggestion selected by the user based on the one or more user behaviors; and
   determining that the user has finished the selection.

21. A system having at least one processor, storage, and a communication platform for providing a query suggestion, the system comprising:
   a request processing unit configured for receiving a query from a user;
   a user identification unit configured for obtaining user information associated with the user;
   a user selected suggestion controlling unit configured for identifying a search record associated with the user based on the user information and retrieving a plurality of query suggestions from the search record based on the query, wherein the search record stores query suggestions previously selected by the user, and wherein the plurality of query suggestions includes a first query suggestion; and
   a query suggestion generation unit configured for generating a second query suggestion based at least partially on the first query suggestion and the query and providing the plurality of query suggestions and the second query suggestion to the user, wherein the user selects more than one query suggestion from the second query suggestion and the provided query suggestions.

22. The system of claim 21, wherein:
   the more than one query suggestion includes a third query suggestion; and
   a search result generated based on the third query suggestion is provided to the user.

23. The system of claim 21, wherein:
   the request processing unit is further configured for receiving a request for updating the search record associated with the user; and
   the user selected suggestion controlling unit is further configured for updating the search record to include the more than one query suggestion selected by the user.

24. The system of claim 22, wherein:
   the user selected suggestion controlling unit is further configured for retrieving a fourth query suggestion from the search record; and
   the query suggestion generation unit is further configured for providing the fourth query suggestion to the user, wherein the fourth query suggestion is to be presented together with the search result to the user.

25. A non-transitory machine-readable medium having information recorded thereon for providing a search result, wherein the information, when read by the machine, causes the machine to perform the following:
   receiving a query from a user;
   obtaining a plurality of query suggestions generated based on the query;
   providing the plurality of query suggestions to the user;
   receiving a selection of more than one query suggestion from the plurality of query suggestions from the user;
   obtaining a first search result generated based on at least one of the more than one query suggestion; and
   providing the first search result to the user.

26. The medium of claim 25, wherein the information, when read by the machine, further causes the machine to perform the following:
   obtaining user information associated with the user; and
   sending a request for updating a search record associated with the user based on the user information, wherein
   the search record includes one or more stored query suggestions previously selected by the user, and
   the search record is to be updated to include the more than one query suggestion based on the selection from the user.

27. The medium of claim 26, wherein the information, when read by the machine, further causes the machine to perform the following:
   obtaining a retrieved query suggestion that is retrieved from the search record; and providing the retrieved query suggestion to the user, wherein:

the retrieved query suggestion is one of the one or more stored query suggestions previously selected by the user, the retrieved query suggestion is different from the at least one of the more than one query suggestion, and the retrieved query suggestion is to be presented together with the first search result to the user.

28. A non-transitory machine-readable medium having information recorded thereon for providing a query suggestion, wherein the information, when read by the machine, causes the machine to perform the following:

receiving a query from a user;

obtaining user information associated with the user;

identifying a search record associated with the user based on the user information, wherein the search record stores query suggestions previously selected by the user;

retrieving a plurality of query suggestions from the search record based on the query, wherein the plurality of query suggestions includes a first query suggestion;

generating a second query suggestion based at least partially on the first query suggestion and the query; and providing the plurality of query suggestions and the second query suggestion to the user, wherein the user selects more than one query suggestion from the second query suggestion and the provided query suggestions.

29. The medium of claim 28, wherein:

the more than one query suggestion includes a third query suggestion; and a search result generated based on the third query suggestion is provided to the user.

30. The medium of claim 28, wherein the information, when read by the machine, further causes the machine to perform the following:

receiving a request for updating the search record associated with the user; and updating the search record to include the more than one query suggestion selected by the user.

* * * * *